United States Patent
Bereski et al.

(10) Patent No.: US 11,025,748 B2
(45) Date of Patent: Jun. 1, 2021

(54) METHOD FOR CONTROLLING SIMULTANEOUS ACCESS TO DATA PRODUCED BY DEVICES COUPLED TO A MOBILE SYSTEM COUPLED TO A CPE

(71) Applicant: Alcatel Lucent, Boulogne Billancourt (FR)

(72) Inventors: Philippe Bereski, Nozay (FR); Christophe Doiteaux, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 1020 days.

(21) Appl. No.: 14/762,236

(22) PCT Filed: Dec. 20, 2013

(86) PCT No.: PCT/EP2013/077564
§ 371 (c)(1),
(2) Date: Jul. 21, 2015

(87) PCT Pub. No.: WO2014/114416
PCT Pub. Date: Jul. 31, 2014

(65) Prior Publication Data
US 2015/0365499 A1    Dec. 17, 2015

(30) Foreign Application Priority Data

Jan. 22, 2013    (EP) .................................... 13152245

(51) Int. Cl.
*H04L 29/06* (2006.01)
*H04L 29/12* (2006.01)

(52) U.S. Cl.
CPC .......... *H04L 67/42* (2013.01); *H04L 61/2015* (2013.01); *H04L 69/16* (2013.01);
(Continued)

(58) Field of Classification Search
CPC ............. H04L 61/2015; H04L 61/2061; H04L 61/2076; H04L 61/2007; H04L 61/6068;
(Continued)

(56) References Cited

U.S. PATENT DOCUMENTS 8,050,192 B2 * 11/2011 Park .................... H04L 12/2803
370/254
8,312,531 B2 * 11/2012 Walter .................. H04L 63/166
380/270
(Continued)

FOREIGN PATENT DOCUMENTS

CN    1817013    8/2006
CN    1849587    10/2006
(Continued)

OTHER PUBLICATIONS

Mark Rutherford, "Infantry to lead the way with a new PDA," 2007, CNET, www.cnet.com/news/infantry-to-lead-the-way-with-a-new-pda/.*

(Continued)

*Primary Examiner* — Ruolei Zong
(74) *Attorney, Agent, or Firm* — Fay Sharpe LLP

(57) ABSTRACT

A mobile system (S1) comprises i) a first operating system (OS1), capable of exchanging data with a CPE (E1), ii) a second operating system (OS2) with a tunnel layer and coupled to devices (D1-D3) having respective IP prefixes and producing data to be accessed from a central application, via a client gateway (CG), iii) a first means (M1) for obtaining a first IP address for the second operating system (OS2) from the CPE (E1) and through the first operating system (OS1), and a second means (M2) for triggering transmission of this first IP address and the device prefixes by the second operating system (OS2) to the client gateway (CG), through the first operating system (OS1) and the CPE (E1), for requesting the establishment of a tunnel between (Continued)

the second operating system (OS1) and the client gateway (CG) to allow the central application to access to data generated by the devices.

16 Claims, 2 Drawing Sheets

(52) U.S. Cl.
CPC ...... *H04L 61/2007* (2013.01); *H04L 61/2076* (2013.01); *H04L 61/6068* (2013.01)

(58) Field of Classification Search
CPC ............... H04L 63/0272; H04L 63/029; H04L 12/4641; H04L 69/16
USPC .......................................................... 709/203
See application file for complete search history.

(56) References Cited

U.S. PATENT DOCUMENTS

| | | | | |
|---|---|---|---|---|
| 9,317,983 | B2* | 4/2016 | Ricci | H04W 4/21 |
| 2003/0106067 | A1* | 6/2003 | Hoskins | H04L 12/2801 |
| | | | | 725/119 |
| 2006/0092949 | A1 | 5/2006 | Thubert et al. | |
| 2007/0038743 | A1* | 2/2007 | Hellhake | H04L 29/12283 |
| | | | | 709/224 |
| 2010/0165993 | A1* | 7/2010 | Basilier | H04L 12/2809 |
| | | | | 370/395.53 |
| 2012/0084411 | A1* | 4/2012 | Sood | H04L 29/12396 |
| | | | | 709/220 |
| 2012/0162445 | A1 | 6/2012 | Kim | |
| 2013/0182845 | A1* | 7/2013 | Monica | H04L 63/0869 |
| | | | | 380/270 |

FOREIGN PATENT DOCUMENTS

| | | |
|---|---|---|
| CN | 101019381 | 8/2007 |
| JP | 2009234468 A | 10/2009 |
| KR | 20090051427 A | 5/2009 |

OTHER PUBLICATIONS

Russ White, "Working with IP Addresses", Mar. 2006, The Internet Protocol Journal, vol. 9, No. 1, p. 24-34, ISSN 1944-1134, ipj.dreamhosters.com/wp-content/uploads/issues/2006/ipj09-1.pdf (Year: 2006).*

Jason Fitzpatrick, "How to Run Windows, Mac, and Linux Side by Side and Pain-Free with VirtualBox", Aug. 2010, lifehacker.com, lifehacker.com/how-to-run-windows-mac-and-linux-side-by-side-and-pai-5623313 (Year: 2010).*

Philippe Bereski et al., "Dual Stack deployment using DSTM and neighbour discovery <draft-bereski-ngtrans-nd-dstm-01.txt>," XP015000239, 12 pages, Feb. 2002.

International Search Report for PCT/EP2013/077564 dated Jun. 18, 2014.

* cited by examiner

METHOD FOR CONTROLLING SIMULTANEOUS ACCESS TO DATA PRODUCED BY DEVICES COUPLED TO A MOBILE SYSTEM COUPLED TO A CPE

TECHNICAL FIELD

The present invention relates to access from central applications to data produced by several devices coupled to a mobile system that is itself coupled to a customer premises equipment (or CPE).

BACKGROUND OF THE INVENTION

Some first systems, such as personal computers, tablets, IP routers or layer 2 switches, may be located into second mobile systems, such as vehicles, in order to receive data that are produced by several devices equipping these second mobile systems. For instance, these devices may be sensors, PC, tablets, IP connected objects, or cameras intended for providing image data or else voice data systems.

In certain circumstances these produced data must be live accessed from a remote central command center to be processed and/or analyzed by one or more persons. This may be the case, for instance, of the data produced by devices equipping a fleet of police cars and intended to a police central command center.

In order the first system be capable of exchanging data with such a central command center, it has to comprise a wireless communication module or to be coupled, directly or indirectly (for instance through the second mobile system), to a customer premises equipment (or CPE) capable of establishing a wireless communication with a mobile communication network. Unfortunately, such a wireless communication module or CPE may only provide access from a central command center to a single device, and therefore cannot ensure simultaneous and live access of data produced by several devices connected to the second mobile system.

A layer 2 solution has been proposed for WiMAX communications, but it does not scale for a great number of mobile systems and, above all, requires collaborative CPEs. Moreover, this solution is not compatible with 3G communications or LTE communications.

SUMMARY OF THE INVENTION

So, the invention aims notably at allowing central applications to access to several mobile systems coupled to respective CPEs to get, simultaneously and live, and possibly ciphered, data produced by several devices coupled to them, even if their associated IP addresses are allocated in a dynamic and versatile way by their mobile communication network.

To this effect the invention notably provides a method, intended for controlling access from at least one central application, via a client gateway connected to a mobile communication network, to data originating from at least two devices having respective IP prefixes and coupled to a mobile system comprising a first operating system, capable of exchanging data with a customer premises equipment, and a second operating system with a tunnel layer, and comprising:

a step (i) during which the second operating system obtains a first IP address from the customer premises equipment, through the first operating system, and a step (ii) during which the second operating system transmits this first IP address and the device prefixes to the client gateway, through the first operating system and the customer premises equipment, to request the establishment of a tunnel between the second operating system and the client gateway, and therefore allows the central application to access, via the client gateway, to data generated by the devices.

Such a method does not require any specific CPE nor modification of existing mobile communication networks.

The method according to the invention may include additional characteristics considered separately or combined, and notably:

the first IP address may be the one of the customer premises equipment;

in step (ii) a second IP address of the client gateway is either statically configured into the second operating system, or computed from an address, of a core network gateway of the mobile communication network, which is dynamically learnt by the first operating system or learnt from a DHCP like server to which the client gateway is coupled;

the first and second operating systems may be instantiated into the mobile system respectively as first and second virtual machines that are connected via virtual network interfaces making them a private network that is not seen out of the mobile system;

the first virtual machine may share its radio connection with the second virtual machine over a virtual network interface it comprises;

in step (ii) a second IP address of the client gateway may be either statically configured into the second virtual machine, or computed from an address of a core network gateway of the mobile communication network which is dynamically learnt by the first virtual machine or learnt from a DHCP like server to which the client gateway is coupled;

the first operating system may be Windows® and the second operating system may be Linux;

the established tunnel may have a type chosen from a group comprising at least a GRE ("Generic Routing Encapsulation") type and an IPSec type.

The invention also provides a mobile system comprising:

a first operating system capable of exchanging data with a customer premises equipment (or CPE), a second operating system with a tunnel layer and allowing coupling of at least two devices having respective IP prefixes and producing data to be accessed from at least one central application, via a client gateway connected to a mobile communication network, a first means arranged for obtaining a first IP address for the second operating system from the customer premises equipment and through the first operating system, and a second means arranged for triggering transmission of the first IP address and the device prefixes by the second operating system to the client gateway, through the first operating system and the customer premises equipment, for requesting the establishment of a tunnel between the second operating system and the client gateway, and therefore allows the central application to access, via the client gateway, to data generated by the devices.

The mobile system according to the invention may include additional characteristics considered separately or combined, and notably:

it may comprise a first equipment comprising the first operating system and to which the customer premises equipment is connected, and a second equipment coupled to the first equipment, comprising the second operating system and to which the devices are coupled;

the second equipment may comprise the first and second means;

in a variant of embodiment, the first and second operating systems may be instantiated respectively as first and second virtual machines that are connected via a private network which is not routed over a virtual switch of the mobile system;

the first operating system may be Windows® and the second operating system may be Linux.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its understanding, if need be.

The invention aims, notably, at offering a method, and an associated mobile system Sj, intended for controlling access from at least one central application CAn, via a client gateway, to data originating from at least two devices Di coupled to this mobile system Sj.

In the following description it will be considered that each mobile system Sj (j=1 or 2) equips a vehicle Vj, such as a police car, for instance. But the invention is not limited to this application. Indeed, a mobile system Sj according to the invention may equip a person also equipped with devices Di, for instance. It is important to note that the system Sj is mobile because it is itself located into another mobile system (such as a vehicle or a person).

Figure 1:
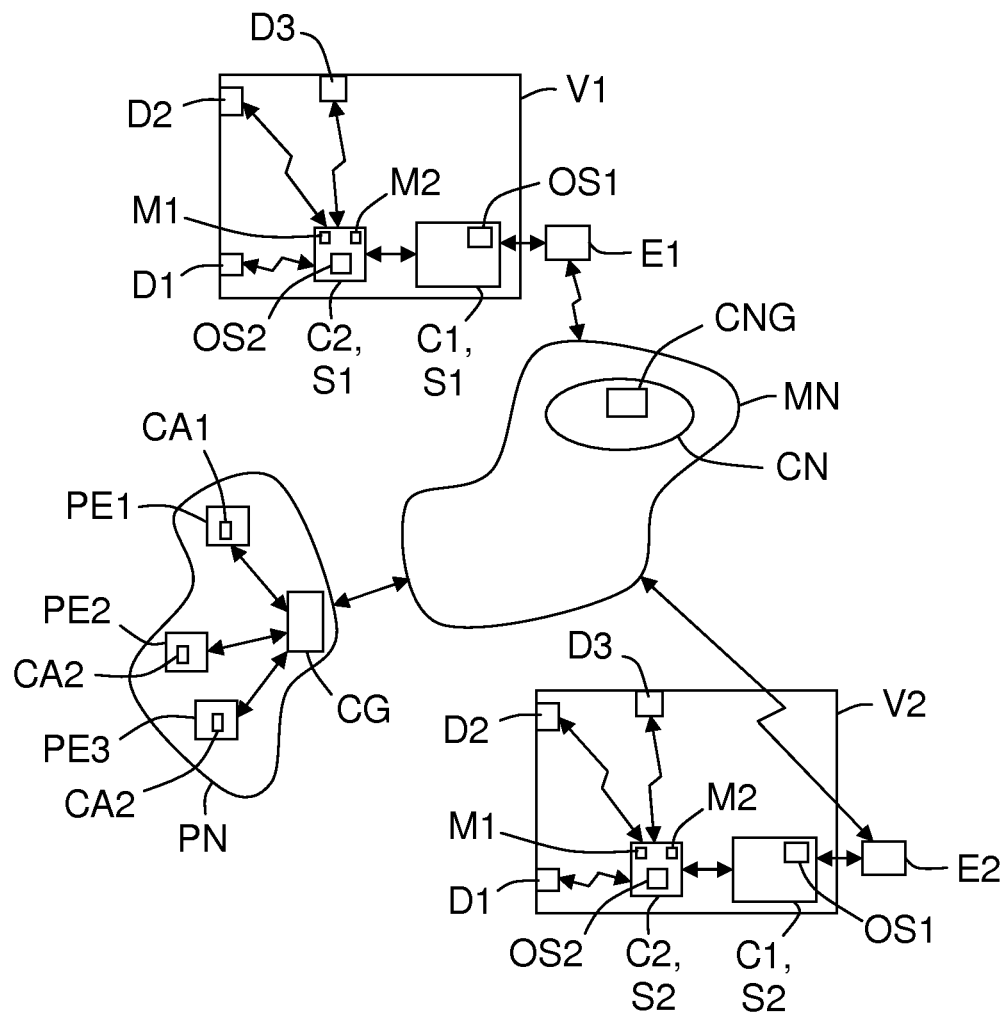
FIG. 1 schematically and functionally illustrates vehicles comprising three devices and a first example of embodiment of a mobile system according to the invention coupled to a CPE that is connected to a mobile communication network to which is also connected a client network, FIG. 2 schematically and functionally illustrates vehicles comprising three devices and a second example of embodiment of a mobile system according to the invention coupled to a CPE that is connected to a mobile communication network to which is also connected a client network, and FIG. 3 schematically illustrates an example of sequence diagram intended for allowing establishment of a tunnel between a second operating system (of the mobile system of FIG. 2) and a client gateway (of the client network of FIG. 2) to allow devices to be accessed from central applications via this client gateway.
Figure 2:
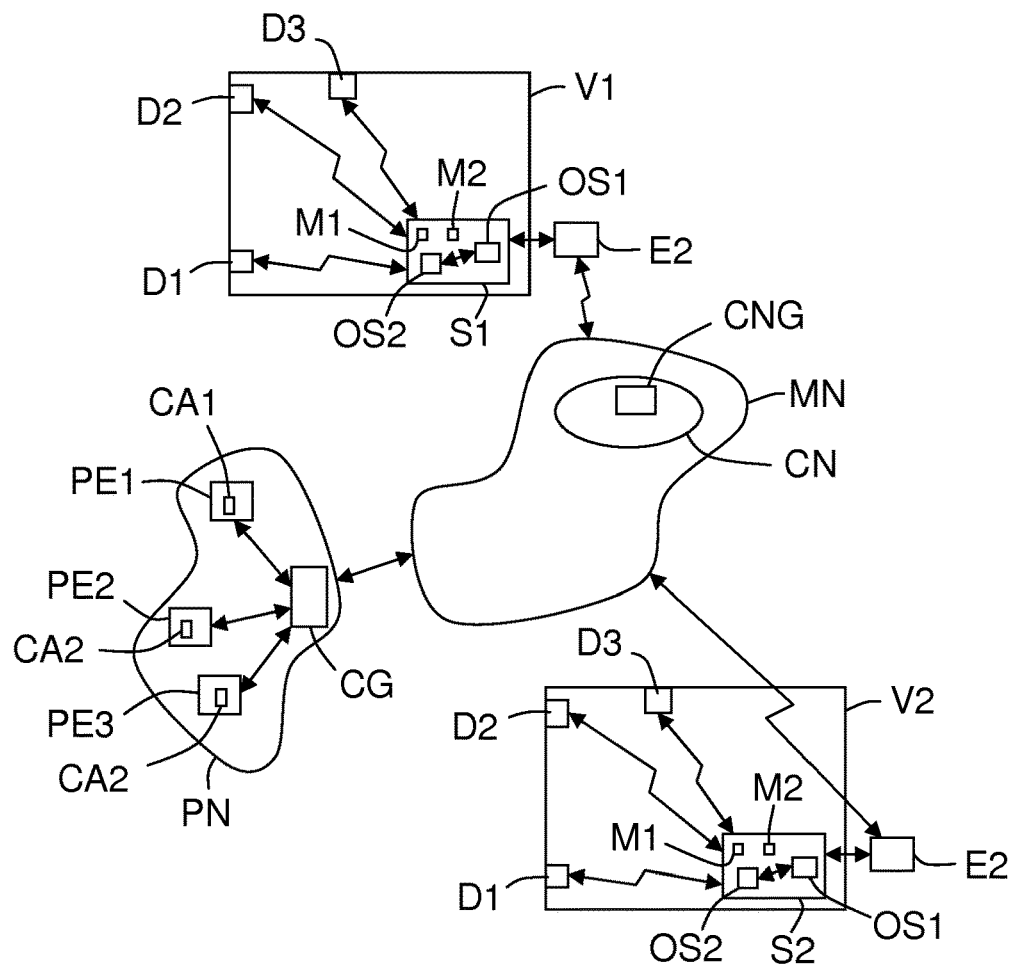

In the non-limiting examples illustrated in FIGS. 1 and 2, each vehicle Vj comprises three devices Di (i=1 to 3) producing data to be live accessed. But the number of devices Di may be smaller or greater than three, since it is at least equal to two. For instance, these devices Di may be sensors or cameras intended for providing image data (and may be of a CCTV ("Closed-Circuit TeleVision") type, for instance) or biological sensors or any IP object or VoIP terminal (including WiFi personal digital assistant (or PDA) if a mobile system Sj provides WiFi access point in addition to its wired interface).

The data produced by the devices Di of each vehicle Vj are intended to be accessed by at least one central application CAn, running into at least one processing equipment PEk of the client network PN, via a client gateway CG and through at least one mobile communication network MN comprising a core network CN. For instance, and as illustrated in the non-limiting examples of FIGS. 1 and 2, the client gateway CG may belong to a client network PN and may be coupled to several processing equipments PEk (here k=1 to 3) intended for analysing and/or processing the data produced by the device Di thanks to the control method and mobile systems Sj according to the invention.

In the non limiting example a first central application CA1 (n=1) is running into a first processing equipment PE1, and a second central application CA2 (n=2) is running into second PE2 and third PE3 processing equipments. But more or less than two central applications CAn could access to the device data.

It is important to note that each mobile system Sj of a vehicle Vj comprises a first operating system OS1, that is capable of exchanging data with a customer premises equipment (or CPE) Ej (coupled to its mobile system Sj), and a second operating system OS2, that comprises a tunnel layer and is capable of exchanging data with the devices Di of the vehicle Vj. This second operating system OS2 is capable of exchanging data with the devices Di of the Vehicle Vj via any valid IP interface such as, but not limited to, Ethernet or Wi-Fi.

For instance, the first operating system OS1 may be Windows® and the second operating system OS2 may be Linux. But this is not mandatory. Other combinations of operating systems may be envisaged by the man skilled in the art.

In the first example of embodiment illustrated in FIG. 1, each mobile system Sj comprises a first equipment C1 that comprises a first operating system OS1 and to which a customer premises equipment Ej is connected, and a second equipment C2 that is coupled to the first equipment C1, comprises a second operating system OS2 and to which devices Di are coupled.

For instance, the first equipment C1 may be a laptop. But this is not mandatory. Indeed it may be also a tablet, or any electronic equipment controlled by an operating system and to which at least one CPE Ej can be coupled. It could be also an appliance known as a "3G/4G gateway" consisting of one CPE and one or several IP interfaces like, but not limited to, Ethernet or Wi-Fi.

Also for instance, the customer premises equipment (or CPE) Ej can be of a USB type or a PCMCIA 3G/4G type. But this is not mandatory.

Also for instance, the second equipment C2 may be a low power (below 10 W) electronic box controlled by an operating system and to which can be coupled at least two devices Di. But this is not mandatory. Indeed it may be also a laptop or a tablet, or any electronic equipment controlled by an operating system and capable of exchanging data with devices Di.

In the second example of embodiment illustrated in FIG. 2, each mobile system Sj comprises first OS1 and second OS2 operating systems instantiated respectively as first and second virtual machines connected via two virtual network interfaces. These two virtual network interfaces embody a private network which is not seen out of the mobile system Si.

The control method according to the invention comprises at least two steps (i) and (ii).

In the first step (i) the second operating system OS2 of a mobile system Sj obtains a first IP address from the associated customer premises equipment Ej, through the first operating system OS1.

This first step (i) can be performed by a first means M1 of a mobile system Sj. More precisely, this first means M1 is arranged for obtaining a first IP address for the second operating system OS2 from the associated customer premises equipment Ej and through the first operating system OS1.

This first means M1 is preferably made of software modules running into the second operating system OS2. In this case it can be stored in a memory. In the first example of embodiment illustrated in FIG. 1, the first means M1 is preferably located in the second equipment C2 running under the control of the second operating system OS2.

The first IP address can be obtained from the customer premises equipment Ej, through the first operating system OS1. It may be the IP address of this customer premises equipment Ej. The man skilled in the art calls this "transparent mode".

In a variant, the first IP address can be requested by the customer premises equipment Ej near the core network CN of the mobile communication network MN to which it is connected (this may be also a transparent mode).

In the second step (ii) of the control method the second operating system OS2 transmits the obtained first IP address and IP prefixes associated respectively to the devices Di to the client gateway CG, through the first operating system OS1 and the customer premises equipment Ej. This transmission is intended for requesting the establishment of a tunnel between the second operating system OS2 and the client gateway CG to allow the client gateway CG (and therefore at least one central application CAn) to access to data produced by each of the devices Di.

This second step (i) can be initiated by a second means M2 of a mobile system Sj. More precisely this second means M2 is arranged for triggering transmission of the first IP address and the device IP prefixes by the second operating system OS2 to the client gateway CG as described above.

This second means M2 is preferably made of software modules. In this case it can be stored in a memory. In the first example of embodiment illustrated in FIG. 1, the second means M2 is preferably located in the second equipment C2.

In order the tunnel to be set up between the second operating system OS2 and the client gateway CG, the second operating system OS2 must receive a second IP address of this client gateway CG. This can be done during the second step (ii) by statically configuring the second IP address of the client gateway CG into the second operating system OS2 (FIG. 1) or the second operating system OS2 of the second virtual machine (FIG. 2). In a variant, it can be done after having computed the second IP address of the client gateway CG from an address, of a gateway CNG of the core network CN of the mobile communication network MN, which is dynamically learnt by the first operating system OS1 (FIG. 1) or the second operating system OS2 of the first virtual machine (FIG. 2), or learnt from a DHCP like server ("Dynamic Host Configuration Protocol") to which the client gateway CG is coupled. This server is preferably located into the customer network aside the application processing elements. This makes the system independent from the will of the mobile network operator.

The established tunnel can be a GRE ("Generic Routing Encapsulation") tunnel or an IPSec tunnel or else an IP in IP tunnel. This depends, notably, from the type of the client gateway CG (which depends from the client choice).

In the second example of embodiment illustrated in FIG. 2, the first virtual machine OS1 preferably shares its radio connection with the second virtual machine OS2 over a virtual Ethernet interface it comprises. Moreover, the second virtual machine OS2 comprises preferably a physical Ethernet interface with an IP prefix (v4 or v6) that is globally routable over the client network PN. More, the first virtual machine OS1 preferably uses its port sharing to forward any data coming from the CPE Ej to the second virtual machine OS2.

Once a tunnel is established, the first operating system OS1 (or the first virtual machine) unconditionally forwards all packets to the second operating system OS2 (this is a static configuration of the first operating system OS1), the second operating system OS2 (or the second virtual machine) acts as a first Tunnel End Point (or TEP), and the client gateway CG acts as a second TEP.

Figure 3:
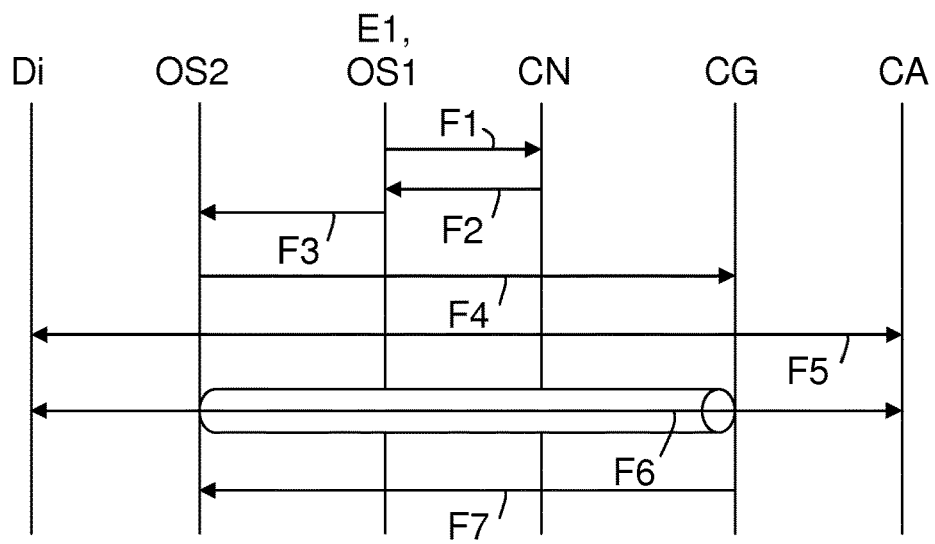

An example of sequence diagram intended for allowing establishment of a tunnel between the second operating system OS2 of a mobile system Sj and a client gateway CG of a client network PN is illustrated in FIG. 3.

In a first step F1, the first virtual machine OS1, in cooperation with the CPE Ej, transmits a connection request to the core network CN of the mobile communication network MN. In a second step F2, the core network CN transmits a message, indicating that the connection is accepted and comprising a first IP address allocated for this connection, to the CPE Ej.

In a third step F3, the first virtual machine OS1 transmits the allocated first IP address to the second virtual machine OS2. Then, in a fourth step F4 the second virtual machine OS2 transmits the first IP address and the device IP prefixes to the client gateway CG, through the first operating system OS1, the customer premises equipment Ej, and the mobile communication network MN. This transmission is intended for requesting the establishment of a tunnel between the second operating system OS2 and the client gateway CG to allow the client gateway CG (and therefore at least one central application CAn) to access to data produced by each of the devices Di.

In a fifth step F5, a tunnel and the associated route(s) are set up between the second operating system OS2, and then the devices Di, and the client gateway CG, and then at least one central application CAn running into at least one processing equipment PEk of the client network PN. Any old tunnel previously established is removed.

In a sixth step F6, the tunnel is ready to be used to allow the client gateway CG (and therefore at least one central application CAn) to access to data produced by the devices Di in a transparent IP communication.

In a seventh step F7, the client gateway CG may transmit a message to the second operating system OS2 to request disconnection of the second virtual machine OS2. In variant, this termination process F7 could be also initiated by the second operating system OS2 toward the client gateway CG.

The invention is not limited to the embodiments of method and mobile system described above, only as examples, but it encompasses all alternative embodiments which may be considered by one skilled in the art within the scope of the claims hereafter.

The invention claimed is:

1. A method for controlling access from at least one central application, via a client gateway connected to a mobile communication network, to data originating from at least two devices having respective IP prefixes and coupled to a mobile system comprising a first operating system being capable of exchanging data with a customer premises equipment coupled with the mobile system, and a second operating system comprising a tunnel layer and allowing coupling the at least two devices to the mobile system, said method comprising:

obtaining, by said second operating system, a first IP address from said customer premises equipment, through said first operating system; and transmitting, by said second operating system, said first IP address and said IP prefixes to said client gateway, through said first operating system and said customer premises equipment, to request the establishment of a tunnel between said second operating system and said client gateway, and thereby allowing said central application to access, via said client gateway, data generated by said devices;

wherein said established tunnel is of a GRE type.

2. The method according to claim 1, wherein said first IP address corresponds to said customer premises equipment.

3. The method according to claim 2, wherein a second IP address of said client gateway is either statically configured into said second operating system, or computed from an address of a core network gateway of said mobile communication network, which is dynamically learnt by said first operating system or learnt from a DHCP like server to which said client gateway is coupled.

4. The method according to claim 1, wherein said first and second operating systems are instantiated into said mobile system respectively as first and second virtual machines that are connected via virtual network interfaces making them a private network that is not seen out of said mobile system.

5. The method according to claim 4, wherein said first virtual machine shares its radio connection with said second virtual machine over a virtual network interface it comprises.

6. The method according to claim 4, wherein a second IP address of said client gateway is either statically configured into said second virtual machine, or computed from an address of a core network gateway of said mobile communication network, which is dynamically learnt by said first virtual machine or learnt from a DHCP like server to which said client gateway is coupled.

7. The method according to claim 1, wherein said first operating system is Windows and said second operating system is Linux.

8. A vehicle including a mobile system comprising a computer with a first operating system being capable of exchanging data with a customer premises equipment coupled with the mobile system, and a second operating system comprising a tunnel layer and allowing coupling of at least two devices to the mobile system, the at least two devices comprising a sensor and/or a camera, and having respective IP prefixes and producing data to be accessed from at least one central application, via a client gateway connected to a mobile communication network, wherein the computer is configured to:

obtain a first IP address for said second operating system from said customer premises equipment and through said first operating system; and trigger transmission of said first IP address and said IP prefixes by said second operating system to said client gateway, through said first operating system and said customer premises equipment, for requesting the establishment of a tunnel between said second operating system and said client gateway, and thereby allowing said central application to access, via said client gateway, data generated by said devices;

wherein said established tunnel is of a GRE type.

9. The vehicle according to claim 8, further comprising:
a first equipment comprising said first operating system, wherein said customer premises equipment is connected to said first equipment; and
a second equipment coupled to said first equipment, comprising said second operating system, wherein the second equipment is a below 10 watt electronic box;
wherein said devices are coupled to said second equipment.

10. The vehicle according to claim 9, wherein said second equipment comprises said obtainer and said trigger.

11. The vehicle according to claim 8, wherein said first and second operating systems are instantiated respectively as first and second virtual machines that are connected via a private network which is not routed over a virtual switch of said mobile system.

12. The vehicle according to claim 8, wherein said first operating system is Windows and said second operating system is Linux.

13. The method according to claim 1, wherein:
said first IP address corresponds to said customer premises equipment; and
a second IP address of said client gateway is computed from an address of a core network gateway of said mobile communication network, which is dynamically learnt by said first operating system.

14. The method according to claim 1, wherein:
said first IP address corresponds to said customer premises equipment; and
a second IP address of said client gateway is computed from an address of a core network gateway of said mobile communication network, which is dynamically learnt from a DHCP like server to which said client gateway is coupled.

15. The method according to claim 1, wherein the at least two devices are biological sensors.

16. The method according to claim 2, wherein a second IP address of said client gateway is statically configured into said second operating system.

* * * * *